United States Patent

Chang

[11] Patent Number: 6,148,397
[45] Date of Patent: Nov. 14, 2000

[54] CPU PLUG-AND-PLAY METHOD AND DEVICE

[75] Inventor: Chen-Yu Chang, Taipei, Taiwan

[73] Assignee: Micro-Star International Co., Ltd., Taipei Hsien, Taiwan

[21] Appl. No.: 09/072,686

[22] Filed: May 6, 1998

[51] Int. Cl.[7] .............................................. G06F 15/177
[52] U.S. Cl. .............................................. 713/1; 713/501
[58] Field of Search .............................. 713/1, 100, 501; 714/23

[56] References Cited

U.S. PATENT DOCUMENTS

| | | | |
|---|---|---|---|
| 5,479,645 | 12/1995 | Sakai et al. | 395/550 |
| 5,784,598 | 7/1998 | Griffith | 395/556 |
| 5,815,694 | 9/1998 | Ganfield et al. | 395/556 |
| 5,845,111 | 12/1998 | Lin et al. | 395/556 |
| 5,940,607 | 8/1999 | Hwang | 395/556 |
| 5,951,681 | 9/1999 | Chang | 713/1 |

Primary Examiner—Joseph E. Palys
Assistant Examiner—Ronald D Hartman, Jr.
Attorney, Agent, or Firm—Bacon & Thomas, PLLC

[57] ABSTRACT

A CPU plug-and-play method includes driving the I/O chip of a computer to generate two reset signals when the computer is booted to respectively reset the ISA and PCI buses of the computer main board, at the same time issuing a CPU control signal to a system logic chip of the computer to gain control of the CPU working frequency setting operation, and transmitting a selected working frequency set by the user via system firmware to a multiple frequency factor control circuit through a universal bus. The multiple frequency control circuit generates and transmits a multiple frequency factor to the CPU by applying a reset signal to the system chip set in response to the multiple frequency factor to generate a CPU reset signal which instructs the CPU to adapt the working speed in accordance with the new multiple frequency factor so that no jumper or other switch is needed to be manipulated in changing working frequency. Thus a plug-and-play method for CPU is provided.

4 Claims, 3 Drawing Sheets

CPU PLUG-AND-PLAY METHOD AND DEVICE

FIELD OF THE INVENTION

The present invention relates generally to a plug-and-play method and device for computer CPU (central processing unit) which allows a user to select the desired working frequency by means of computer firmware without manipulating any jumper or other switch so as to achieve a plug-and-play operation of the CPU, and which allows the computer to be booted within a very short period.

BACKGROUND OF THE INVENTION

Conventionally, the working frequency of a computer is set by manipulating jumpers or other switches on the computer main board. The jumpers are changed in accordance with instruction in a of user guide of the computer main board so as to change a CPU multiple frequency factor and to control the frequency generation of a frequency generator. This, however, may be troublesome to general consumers since most people are not familiar with such a technique, and thus although the user may follow the instruction of the user guide, it is still possible and very often that the computer user cannot perform the frequency modification operation correctly.

An incorrect setting of the working frequency may result in damage to the CPU. Therefore to overcome such a problem, some of the computer main board manufacturers provide a solution which allows the computer user to set the multiple frequency factor directly on the computer screen, similar to the general setting operation of the computer BIOS. For example, an INTEL 200 series CPU requires a working frequency of 200 MHz which is provided by multiplying the basic frequency of the CPU, which is 55.556 MHz, by a multiple frequency factor of 3. In other words, the user selects the basic frequency and the multiple frequency factor on the computer screen and the computer system automatically generates the required 200 MHz working frequency for the CPU.

Although such a solution may work, some of the general consumers may only know the working frequency and not be aware of the "basic frequency" and the "multiple frequency factor". Thus, it is still difficult for the general consumers to set the working frequency in this way.

Furthermore, the conventional way of setting the working frequency is to perform the operation under the condition that the computer is already booted. The setting operation provides a frequency information and frequency switching address signal which, after being decoded, is stored in a storage device. In response to the frequency information, the storage device generates a corresponding multiple frequency factor signal and a frequency selection signal which are applied to the CPU, and a frequency generator and reset signals are sent from a resetting unit to the CPU and the system chip set to enter hardware resetting situation. After the resetting operation, the system chip supplies a reset feedback signal to clear the previous status of the resetting unit which permits the CPU and the system chip set to operate based on the newly selected multiple frequency factor and working frequency. Although this way provides an effective switching operation between different frequencies, it requires additional parts, such as the resetting unit and the storage device. This device and unit may not be of a high cost, but would constitute a substantial cost loss to the computer main board manufacturers which usually conduct a mass production of computer main boards so that even a tiny increase of the cost for each piece of computer main board would eventually result in a major loss of money for the computer main board manufacturers.

In addition, when the computer is booted, besides setting the CPU working frequency, the computer also needs to reset several other elements on the main board, such as ISA bus and PC bus, and the associated peripheral devices, such as hard disk drive, which resetting operation returns the read/write head of the hard disk drive back to the zero track to read the information of the operation system. Clearly, with the conventional way, the peripheral device and buses have to be reset twice. However, some devices, such as ISA and PCI buses, are not capable of being continuously reset and require an interval of at least 2–3 seconds between two successive resetting operations, or else the actuator (usually an electrical motor) of the hard disk drive may not work and/or the booting process may be abnormal due to the incomplete resetting operation of the peripheral chip set. This, apparently, delays the booting procedure. In accordance with the new "instant booting" requirement, the operating system screen should be visible on the computer monitor within 20 seconds of the booting of the computer system.

Thus, in view of the fact that the conventional ways that require a significant increase of additional cost would be of less industrial value, an automatic CPU working frequency setting method is needed which is done on the original computer main board structure without adding extra parts and which may be performed in a plug-and-play fashion by making use of the I/O chip, the multiple frequency control circuit and the system logic chip that are originally provided on the computer main board. Thus a lower cost and industrially highly valuable way of automatically setting the computer working frequency may be obtained.

SUMMARY OF THE INVENTION

The present invention is made to overcome the above mentioned drawbacks, by permitting the I/O chip of the computer main board to generate two reset signals which respectively reset the ISA and PCI buses. Meanwhile, a CPU control signal is generated and applied to the system logic chip of the computer to gain control of the working frequency setting operation. A user selected working frequency, which is set via the computer system firmware, is transmitted via a universal bus to a multiple frequency factor control circuit to generate and apply a multiple frequency factor to the CPU. Thereafter, a reset signal is sent from the multiple frequency factor control circuit to the system chip set to generate a CPU reset signal which resets the CPU with the newly set working speed of the CPU determined by the multiple frequency factor. No manipulation of a jumper or other switch is needed in modifying the CPU frequency so that a plug-and-play fashion of setting the CPU frequency may be obtained.

Another object of the present invention is to make use of the original function of the original parts of a computer system to provide a plug-and-play CPU frequency setting function without a major modification of the computer main board which is done with a very low cost.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
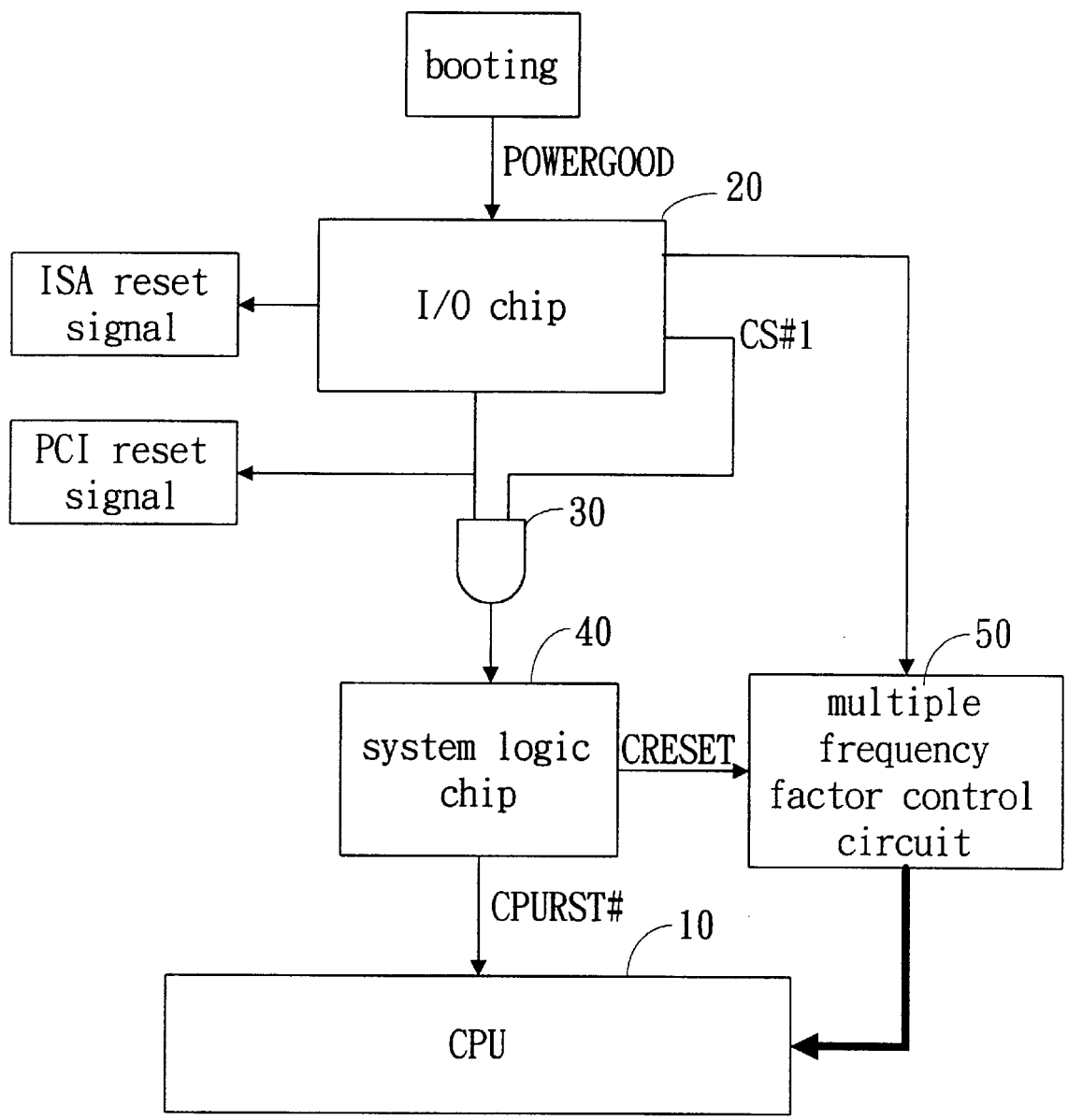
FIG. 1 is an operational flow chart of the present invention.

In accordance with the present invention, to allow a CPU (central processing unit) which is designated with reference numeral 10 in the drawings to be "plug-and-play", a frequency setting operation is provided by the system BIOS in accordance with the desired working frequency of the CPU 10 so as to avoid dismounting/mounting the computer casing and switching jumper on the computer main board.

Figure 2:
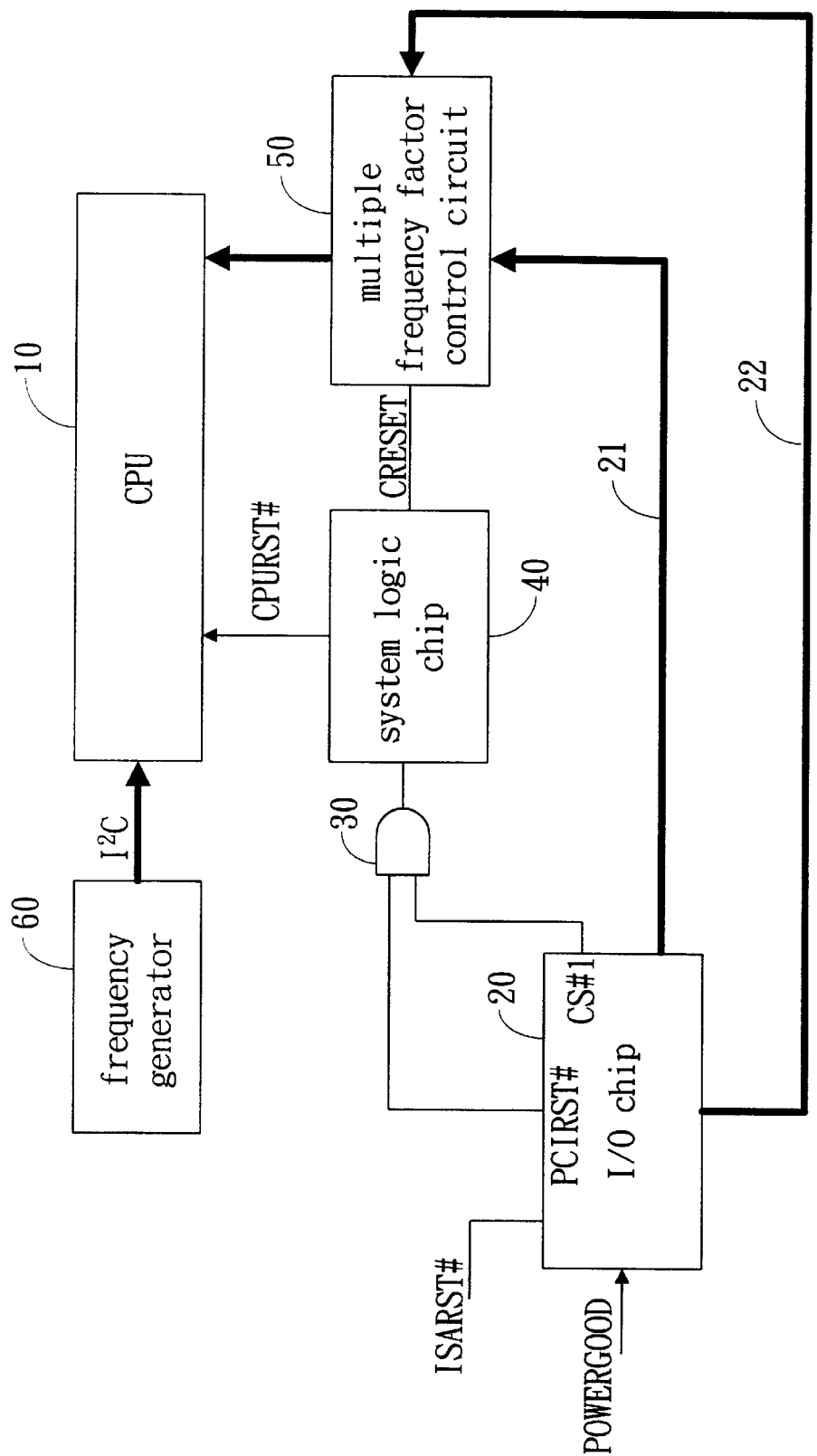
FIG. 2 is a circuit block diagram of the present invention.

FIGS. 1 and 2 respectively show the operational flow chart and the circuit block diagram of the present invention which automatically sets the frequency of a the CPU of a computer system to a desired working frequency. The device of the present invention comprises an I/O chip 20 which is controlled by a power-on signal POWERGOOD of a power supply (not shown) of the computer system to generate the following signals: (1) two reset signals, ISARST# and PCIRST#, which are operable on the ISA and PCI buses of a main board of the computer for booting purpose, (2) a chip setting signal CS#1 which is combined with the reset signal PCIRST# by means of an AND gate 30 to form a latching signal that is applied to a system logic chip or system chip set 40, (3) a CPU bus control signal 21 which is applied to the system logic chip 40 to gain control of the frequency setting operation of the CPU 10, and (4) a signal to provide a desired working frequency of the CPU 10 set by a computer user via system firmware of the computer system to a multiple frequency factor control circuit 50 via a universal bus 22.

The system logic chip 40 receives the latching signal and fixes the current status of the system logic chip 40 in response thereto once the system logic chip 40 receives a chip reset signal (CRESET) from the multiple frequency factor control circuit 50. In other words, once the selected working frequency is confirmed, the system logic chip 40 is no longer affected exterally. A CPU reset signal (CPURST#) is then generated by the system logic chip 40 to reset the CPU which re-boots the computer system with working frequency selected by the user.

Figure 3:
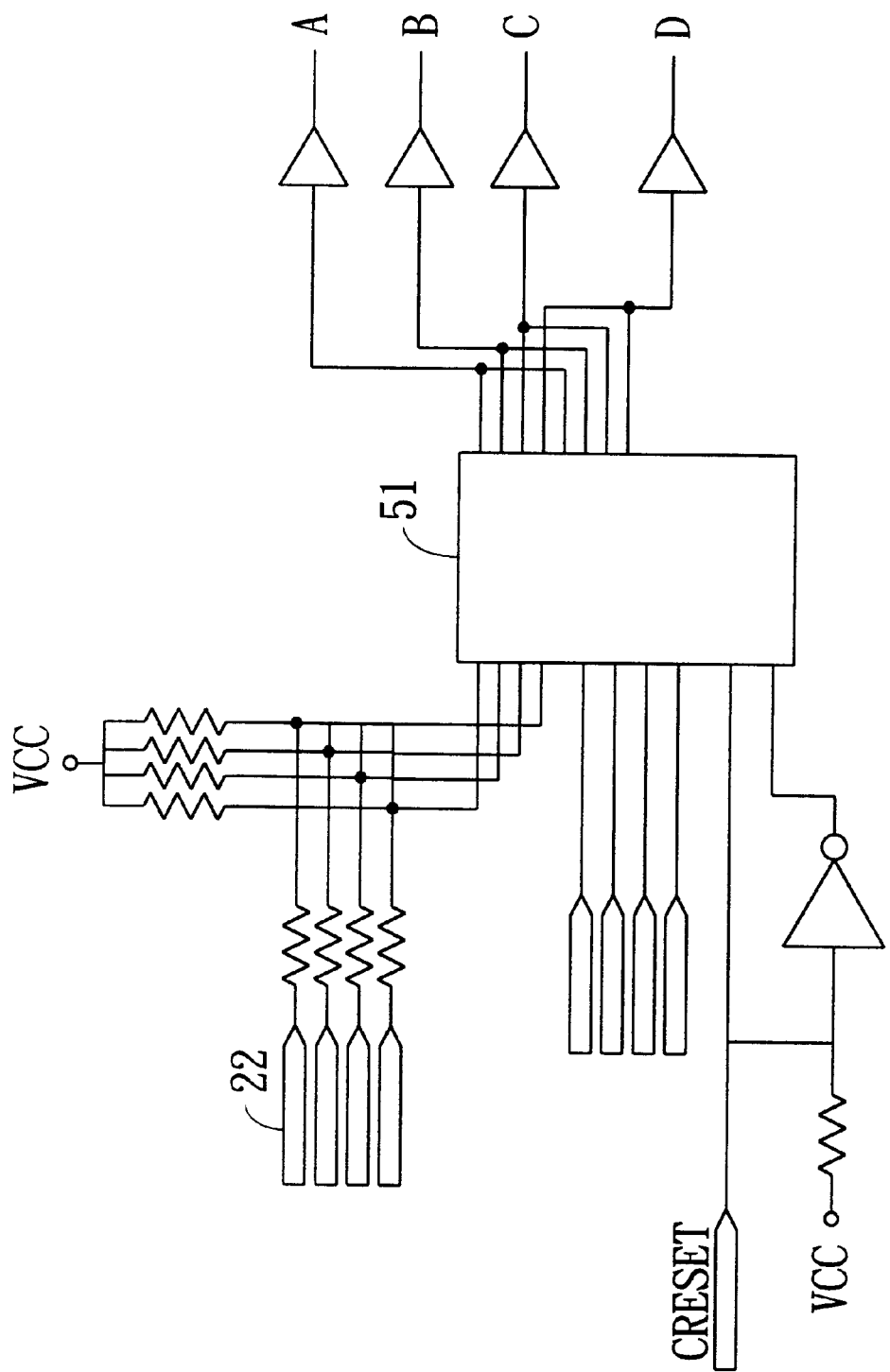
FIG. 3 is a circuit diagram of a multiple frequency factor control circuit incorporated in the circuit of FIG. 2.

The multiple frequency factor control circuit 50, which is more clearly shown in FIG. 3, receives the user selected working frequency which is set by the system firmware through the universal bus 22. The frequency setting signal is encoded by an integrated circuit 51 to provide logic signals on four output lines A, B, C and D which determine the multiple frequency factor in accordance with the following logic table which is pre-defined according to information disclosed by CPU manufacturer:

| Multiple Frequency Factor | Line Reference Character | | | |
|---|---|---|---|---|
| | A | B | C | D |
| 1.5 | H | H | L | H |
| 2 | H | H | H | H |
| 2 | L | L | L | L |
| 2.5 | L | H | L | L |
| 3 | L | L | H | L |
| 3.5 | L | H | H | L |

-continued

| Multiple Frequency Factor | Line Reference Character | | | |
|---|---|---|---|---|
| | A | B | C | D |
| 4 | L | L | L | H |
| 4.5 | L | H | L | H |
| 5 | L | L | H | H |
| 5.5 | L | H | H | H |
| 5 | H | L | L: | L |
| 5.5 | H | H | L | L |
| 6 | H | L | H | L |
| 6.5 | H | H | H | L |
| 8 | H | L | L | H |

In accordance with the above table, when the output of the multiple frequency factor control circuit 50 is for example LLHL, the multiple frequency factor would be three (3). For the case that the output of the multiple frequency factor control circuit 50 is LHLH, the multiple frequency factor is four (4). These are examples only.

When the computer is powered on, the power supply provides the POWERGOOD signal to the I/O chip 20 which in turn generates the PCIRST# and ISARST# signals to reset the associated PCI and ISA buses. The I/O chip 20 also applies the CPU bus control signal 21 to the system logic chip 40 to gain the control of the frequency setting operation of the CPU 10 and also transmits the working frequency that is set by the computer user by means of the system firmware via the bus 22 to the multiple frequency factor control circuit 50.

In the meanwhile, the chip setting signal CS#1 generated by the I/O chip 20 is combined with the PCIRST# reset signal by an AND gate 30 to form the latching signal which is applied to the system logic chip 40. This is done by making use of the logic characteristics of the AND gate that, if any one of the inputs is "0", then the output is "0". After the PCIRST# reset signal is issued, it becomes a logic lower status, namely a logic "0", so that the variation of the chip setting signal CS#1 after boot-up no longer affects the system logic chip 40 and the CPU 10 is maintained at the user-selected working frequency.

Thereafter, the multiple frequency factor control circuit 50 generates the multiple frequency factor which is applied to the CPU 10 and a chip reset signal CRESET which is applied to the system logic chip 40 to make the system logic chip 40 generate a CPU reset signal CPURST# which resets the CPU 10 so that the CPU 10 may be re-booted with the user-selected working frequency.

Furthermore, the present invention optionally comprises a frequency generator 60 which has a serial bus interface which in the embodiment illustrated is an $I^2C$ that allows the frequency generator 60 to provide different frequencies simply by means of a transmission through the serial bus and no external control pin is needed to be connected thereto. This also allows a control of the frequency output pin to selectively output the frequency. When the computer is booted and the CPU 10 is reset, the CPU 10 receives the multiple frequency factor from the multiple frequency factor control circuit 50 and also the user-selected CPU working speed which is generated by a phase latch circuit (not shown) inside the CPU 10 by means of the CPU frequency from the frequency generator. Thereafter, the CPU 10 changes the working speed thereof to correspond to the user-selected working speed. For example, assuming the user selects the working speed of INTEL 200, then the multiple frequency factor control circuit 50 generates the output signal LLHL which after being decoded with the above-listed table indicates a multiple frequency factor of three (3). The multiple frequency factor and the frequency (55.556 MHz) generated by the frequency generator together result in a 200 MHz working frequency in the phase latch circuit, namely 3×55.556≈200 MHz. This accomplishes the automatic setting of working frequency.

By adapting the technique of the present invention, the reset signals for the computer main board and the associated peripheral devices are sent at the same time when the computer is booted and the preparatory operation for booting the computer is completed before the CPU 10 changes the working frequency so that the booting speed of the computer is enhanced which may provide a nearly instant booting. Furthermore, the present invention requires only an additional AND gate, as compared with the original parts and structure of the computer so that the cost is very low and the industrial utilization is significant.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A CPU plug-and-play method for permitting a user to set a desired working frequency of a computer CPU through firmware of the computer, the working frequency setting operation comprising the steps of:

using an I/O chip of the computer to generate a reset signal for ISA and PCI buses and applying a CPU bus control signal to a system logic chip to gain control of a CPU frequency setting operation;

transmitting the desired working frequency set by the user to a multiple frequency factor control circuit via a universal bus;

the multiple frequency factor control circuit generating a multiple frequency factor which is transmitted to the CPU and a chip reset signal which is transmitted to the system logic chip; and the system logic chip generating a CPU reset signal to reset the CPU so as make the CPU reset by adapting the working frequency set by the user;

wherein the working frequency setting operation provides a setting signal which changes the CPU working frequency to achieve the plug-and-play operation of the CPU.

2. A CPU plug-and-play device, comprising:

an I/O chip which is controlled by a signal generated upon turning on a power supply of a computer to which the CPU is mounted, the chip generating, in response thereto, reset signals for resetting ISA and PCI buses of a main board of the computer, a latching signal, and a CPU bus control signal, and transmitting a desired CPU working frequency which is set by a computer user selected setting signal via firmware of the computer to a multiple frequency factor control circuit through a universal bus;

a system logic chip which receives the latching signal to maintain a status of the system logic chip in response to receiving a chip reset signal from the multiple frequency factor control circuit, and generates a CPU reset signal to reset the CPU so as to cause the CPU to be rebooted with a desired working frequency; and the multiple frequency factor control circuit receiving the desired working frequency which is set via the system firmware with the computer user selected setting signal, which setting signal is encoded by a circuit to generate and apply the multiple frequency factor to the CPU.

3. The CPU plug-and-play device as claimed in claim 2, wherein the I/O chip generates a chip setting signal which, upon being combined with the PCI reset signal by an AND gate, forms the latching signal to be applied to the system logic chip to prevent the system ship from variation and thus maintain the CPU at the desired working frequency.

4. The CPU plug-and-play device as claimed in claim 2, further comprising a frequency generator having a serial bus interface for generating different frequencies which allows the CPU to generate the desired working frequency in response to the multiple frequency factor from the multiple frequency factor control circuit when the CPU is reset.

* * * * *